United States Patent
Englert

(10) Patent No.: US 7,538,826 B2
(45) Date of Patent: May 26, 2009

(54) TUNER POWER DISSIPATION REDUCTION IN A STANDBY MODE

(75) Inventor: John Walter Englert, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/537,751

(22) PCT Filed: Dec. 5, 2003

(86) PCT No.: PCT/US03/38895

§ 371 (c)(1),
(2), (4) Date: Jun. 6, 2005

(87) PCT Pub. No.: WO2004/054227

PCT Pub. Date: Jun. 24, 2004

(65) Prior Publication Data

US 2006/0082690 A1    Apr. 20, 2006

Related U.S. Application Data

(60) Provisional application No. 60/431,621, filed on Dec. 6, 2002.

(51) Int. Cl.
*H04N 5/63* (2006.01)
*H04N 5/50* (2006.01)

(52) U.S. Cl. .................. 348/730; 348/731; 348/732; 348/725; 455/191.1; 455/343.1

(58) Field of Classification Search ............... 348/731, 348/730, 732, 733, 725, 729; 334/47, 52, 334/11; 455/183.2, 179.1, 191.1, 343.1; 725/38, 40

See application file for complete search history.

(56) References Cited

U.S. PATENT DOCUMENTS 5,036,261 A * 7/1991 Testin .................... 315/411
5,313,282 A * 5/1994 Hayashi .................... 348/729
5,453,796 A * 9/1995 Duffield et al. ............. 348/565
5,461,427 A * 10/1995 Duffield et al. ............. 348/555

(Continued)

FOREIGN PATENT DOCUMENTS

| GB | 2286712 A * | 8/1995 |
| JP | 01068085 | 3/1989 |
| JP | 11-109439 | 4/1999 |

OTHER PUBLICATIONS

Search Report Dated Oct. 30, 2004.
Supplemental European Search Report Dated Mar. 10, 2006.

*Primary Examiner*—David L Ometz
*Assistant Examiner*—Jean W Désir
(74) *Attorney, Agent, or Firm*—Robert D. Shedd; Joseph J. Opalach; Brian J. Cromarty

(57) ABSTRACT

An apparatus such as a television signal processing apparatus provides a means to control power dissipation by high speed signal processing circuitry associated with tuners while continuing to receive auxiliary data such as administrative data, guide data, or emergency alert notifications. According to an exemplary embodiment, the television signal processing apparatus comprises a first tuner for tuning a first signal when the television signal processing apparatus is in a first mode of operation and where power is removed from the first tuner during a second mode of operation, a second tuner for tuning a second signal when the television signal processing apparatus is in a first mode of operation and a second mode of operation, wherein power is applied to the second tuner for a portion of the time the television signal processing apparatus is in the second mode of operation and the portion of the time the television signal processing apparatus is in the second mode of operation is less than percent of the time the television signal processing apparatus is in the second mode of operation.

8 Claims, 5 Drawing Sheets

U.S. PATENT DOCUMENTS

| | | | |
|---|---|---|---|
| 5,557,338 A * | 9/1996 | Maze et al. | 725/38 |
| 5,659,366 A * | 8/1997 | Kerman | 725/34 |
| 5,699,125 A | 12/1997 | Rzeszewski et al. | |
| 5,797,087 A * | 8/1998 | Lee | 455/181.1 |
| 5,900,913 A * | 5/1999 | Tults | 348/468 |
| 5,929,943 A * | 7/1999 | Bell et al. | 348/730 |
| 6,285,406 B1 * | 9/2001 | Brusky | 348/552 |
| 6,334,217 B1 * | 12/2001 | Kim | 725/38 |
| 6,337,719 B1 * | 1/2002 | Cuccia | 348/731 |
| 6,359,580 B1 * | 3/2002 | Morrison | 348/731 |
| 6,452,644 B1 * | 9/2002 | Shimakawa et al. | 348/730 |
| 6,496,390 B2 * | 12/2002 | Yang | 363/21.07 |
| 6,704,063 B1 * | 3/2004 | Van Der Wulp | 348/734 |
| 6,757,028 B2 * | 6/2004 | Yamamoto | 348/731 |
| 6,900,849 B1 * | 5/2005 | Friedreich | 348/730 |
| 6,995,807 B2 * | 2/2006 | Libera | 348/730 |
| 7,006,161 B2 * | 2/2006 | Testin | 348/730 |
| 2002/0140860 A1 | 10/2002 | Ozaki et al. | |

* cited by examiner

TUNER POWER DISSIPATION REDUCTION IN A STANDBY MODE

This application claims the benefit, under 35 U.S.C. § 365 of International Application PCT/US03/38895, filed Dec. 5, 2003, which was published in accordance with PCT Article 21(2) on Jun. 24, 2004 in English and which claims the benefit of U.S. provisional patent application No. 60/431,621, filed Dec. 6, 2002.

FIELD OF THE INVENTION

The present invention generally relates to apparatuses such as a television signal processing apparatus, that comprise multiple tuners and receive auxiliary data such as administrative data, program guide information or emergency alert signals.

BACKGROUND OF THE INVENTION

The present invention generally relates to apparatuses such as a television signal processing apparatus that comprise multiple tuners and receive auxiliary data such as administrative data, program guide information or emergency alert signals.

Modem signal processing apparatus typically include signal processing circuitry for processing a multitude of signal formats, such as NTSC, ATSC, QAM, or satellite signals. Such a signal processing apparatus typically includes various components such as a tuner for selecting a particular signal or channel from a plurality of signals or channels received by the apparatus. To process digital signals, such as ATSC or satellite signals, the signal processing circuitry, and in particular the tuner, must perform these functions with high-speed digital circuitry. A potential undesirable result of high-speed signal processing is that temperature rise of components used in the signal processing apparatus may approach or exceed reliability limits. It is desirable to reduce the overall operating temperature of the signal processing apparatus when possible to increase the reliability of the signal processing apparatus and to reduce power consumption of the signal processing apparatus during operation.

Signal processing apparatus have various modes of operation depending on its state of use. For example, a signal processing apparatus is in an off mode when it is completely disconnected from a power source. The signal processing apparatus may have a standby mode of operation wherein it is connected to a power source and capable of tuning and receiving particular signals or channels, storing auxiliary data transmitted via these signals or channels, and receiving and processing remote control commands, such as an "on" command, but not operational for producing audio or video output signals. Furthermore, during an on mode of operation the system is fully operational and normally all components are powered and fans can be used to cool the signal processing apparatus. During certain modes of operation certain system components may be disabled to reduce power consumption and noise. In particular, components such as a cooling fan intended to minimize excessive temperature rise of components may be disabled. As a result, component heating may be exacerbated during a mode of operation such as "standby" mode. However, it is not possible to remove power to all components during standby mode as the signal processing apparatus is still required to tune and receiving particular signals or channels, store auxiliary data transmitted via these signals or channels, and receive and process remote control commands. In particular it is desirable to reduce the heat generated by high speed signal processing circuitry associated with the tuners while continuing to receive auxiliary data such as administrative data, guide data, or emergency alert notifications.

SUMMARY OF THE INVENTION

In accordance with an aspect of the present invention, a television signal processing system having a first tuner and a second tuner is disclosed. The present invention solves the described problem providing a switching circuit responsive to a processing means for causing the power supplied to the first tuner to be removed while causing the power to the second tuner to continue to be supplied during one or more modes of operation of the system thereby reducing heat generation and extending the overall life of the product. As a specific example, by disconnecting the main power supplies to the first tuner, internal self-heating of the tuner and subsequent heating of the signal processing apparatus is reduced during the standby mode while maintaining the desirable capabilities of continuing to receive auxiliary data.

BRIEF DESCRIPTION OF THE DRAWING

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF THE PREFERRED EMBODIMENT

The exemplifications set out herein illustrate preferred embodiments of the invention, and such exemplifications are not to be construed as limiting the scope of the invention in any manner.

Figure 1:
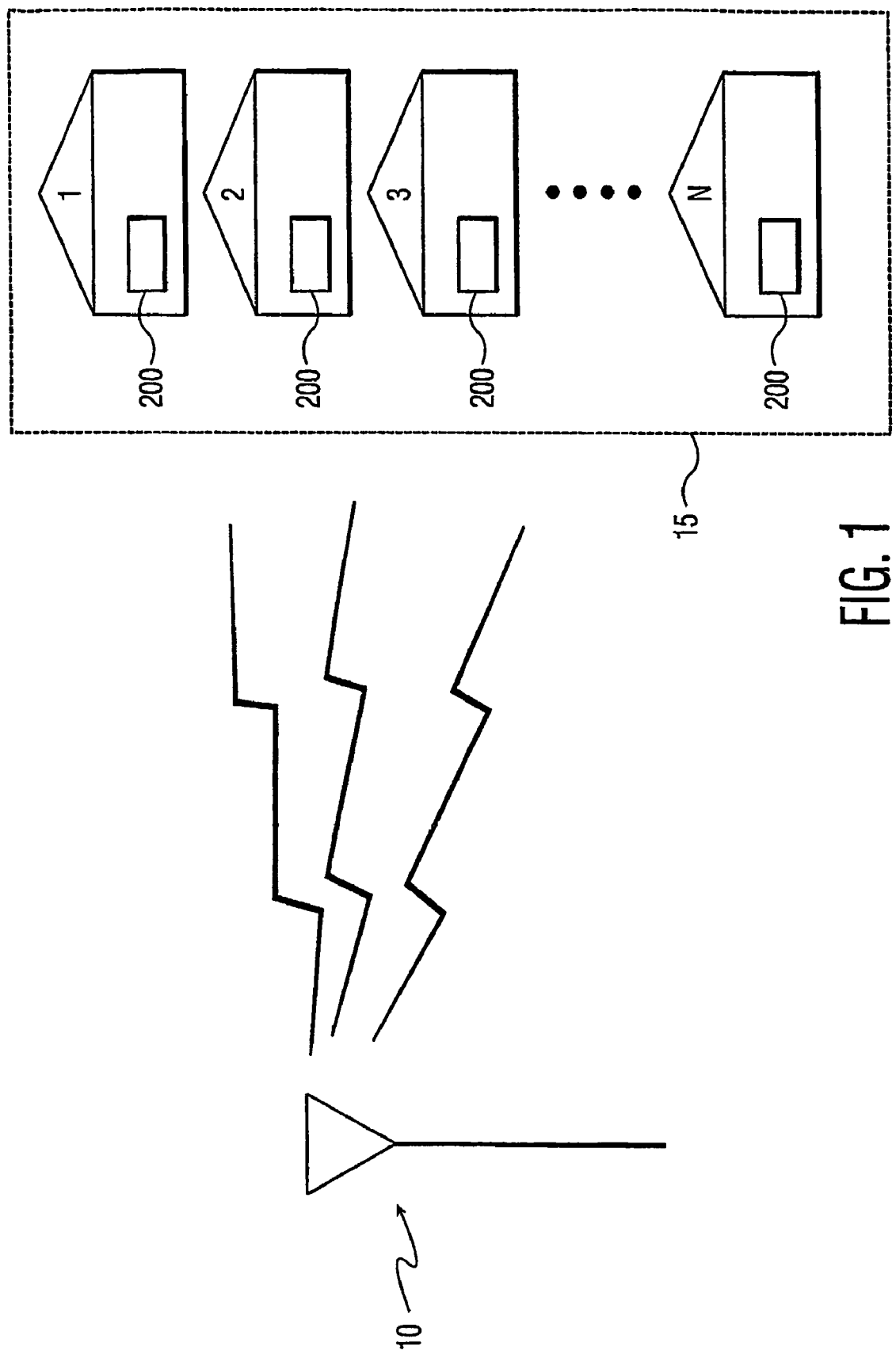
FIG. 1 is an exemplary environment suitable for implementing the present invention.

Referring now to the drawings, and more particularly to FIG. 1, an exemplary environment 100 suitable for implementing the present invention is shown. In FIG. 1, environment 100 comprises signal transmission means such as signal transmission source 10, dwelling means such as dwelling units 15 (i.e., 1, 2, 3 . . . N, where N may be any positive integer), and signal receiving means such as television signal processing apparatus 200.

In FIG. 1, dwelling units 15 may represent residences, businesses and/or other dwelling places located within a particular geographical area, such as but not limited to, a particular continent, country, region, state, area code, zip code, city, county, municipality, subdivision, and/or other definable geographical area. According to an exemplary embodiment, each of the dwelling units 15 is equipped with at least one television signal processing apparatus 200. The present invention, enables the television signal processing apparatus 200 to receive information such as auxiliary data, program guide data, or emergency alert signals when the television signal processing apparatus 200 is in the standby mode while reducing the amount of heat generated by the television signal processing apparatus 200.

According to an exemplary embodiment, the on mode is an operational mode where television signal processing apparatus 200 is turned on (i.e., providing audio and/or video outputs), while the off/standby mode is an operational mode where television signal processing apparatus 200 is turned off (i.e., no audio and/or video outputs) but still receives electrical power. Television signal processing apparatus 200 may for example be switched from the off/standby mode to the on mode responsive to a user input.

Another exemplary embodiment of the television signal processing apparatus 200, such as a color television receiver or video signal processing apparatus that includes capability for simultaneously processing both first and second video signals and for processing auxiliary information. As an example, some video signal processing systems receive and process a first video signal to produce a first output signal representing a first, or "main", image and receive and process a second video signal to produce a second output signal representing a second or auxiliary image. The first and second output signals may be coupled to a display device to produce a displayed image including both the main image and the auxiliary image. A specific example of such systems is a picture-in-picture (PIP) or picture-outside-picture (POP) television system. Such systems may, for example, include first and second tuners for simultaneously and independently selecting the respective first and second video signals that will be processed to produce the respective first and second image-representative output signals. In such systems, e.g., a color television receiver with PIP capability, it may also be desirable to provide for receiving and processing auxiliary information. For example, in addition to receiving video and audio signals associated with television programming, it may also be desirable to receive auxiliary information such as guide data, that can be processed to produce an on-screen-display (OSD) such as an electronic program guide (EPG) to simplify and facilitate user interaction with the television receiver. In addition to providing a picture in picture display on the TV screen the PIP tuner, when the TV is in standby mode, may be used for EPG data collection. To receive and process auxiliary information such as EPG data, the tuner must receive power and be operational so that the channel or signal carrying the data can be selected and provided to the signal processing circuitry. To provide the capability to receive and process auxiliary data while also solving the above-described component heating problem, the system may provide for removing power from a first, possibly more complex tuner, while maintaining power to a second, possibly less complex, second tuner during standby mode.

In another exemplary embodiment, to provide the capability to receive and process auxiliary data while also solving the above-described component heating problem, the system may provide for removing power from a first, possibly more complex tuner, while applying power to a second, possibly less complex tuner, for a particular time period during standby mode, such as an interval or portion of the standby period, during which the auxiliary information can be collected and processed. For example, a control device such as a microprocessor included in the system responds to activation of a particular mode of operation such as standby mode by activating a process for controlling power to the tuner. The process includes turning a single tuner on for a particular amount of time to collect data and then turn the single tuner off. This exemplary embodiment of the invention may have a duty cycle may be around 30% during the standby period. The time period or frequency of the power-on data-collection intervals may be varied in response to various factors. For example, the tuner on-time may be varied in response to component temperature and thereby be on for longer periods as long as temperature is within acceptable limits. Tuner on-time might also be varied in response to the amount of data to be collected or the data rate. For example, the on-time of the tuner is increased if more data must be received and processed or if a slower data rate requires more processing time, as long as component temperatures are acceptable.

Figure 2:
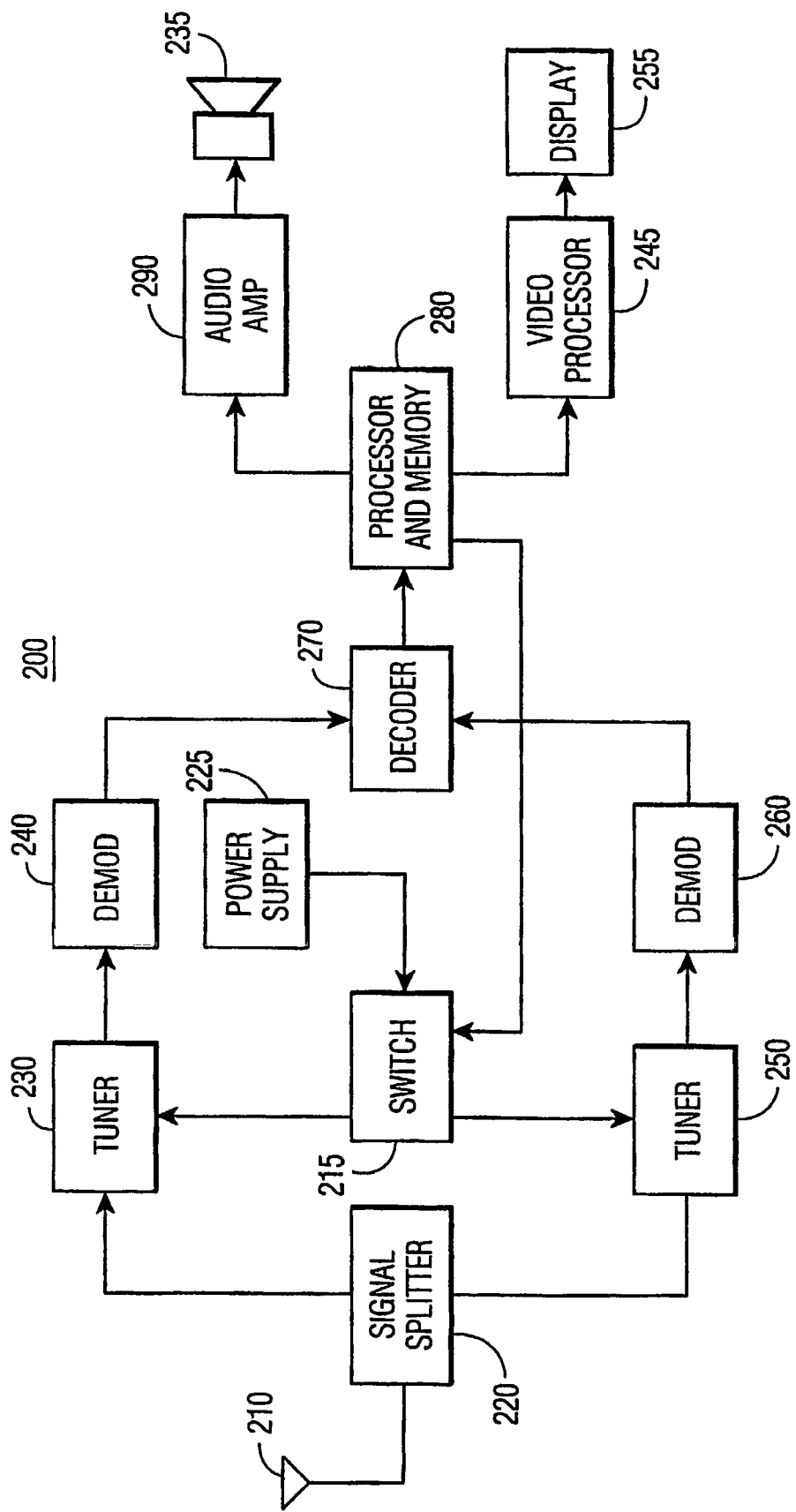
FIG. 2 is a block diagram of a television signal processing apparatus according to an exemplary embodiment of the present invention.

Referring to FIG. 2, a block diagram of an exemplary embodiment of television signal processing apparatus 200 of FIG. 1 is shown. In FIG. 2, television signal processing apparatus 200 comprises signal receiving means such as signal receiving element 210, signal splitting means such as signal splitter 220, first tuning means such as tuner 230, first demodulation means such as demodulator 240, second tuning means such as second tuner 250, second demodulation means such as demodulator 260, decoding means such as decoder 270, processing means and memory means such as processor and memory 280, audio amplification means such as audio amplifier 290, audio output means such as speaker 235, video processing means such as video processor 245, and visual output means such as display 255, a power supply 225 and a switch 215 responsive to said processor and memory 280. Some of the foregoing elements may for example be embodied using integrated circuits (ICs). For clarity of description, certain conventional elements of television signal processing apparatus 200 including control signals may not be shown in FIG. 2. According to an exemplary embodiment, television signal processing apparatus 200 may receive and process signals in analog and/or digital formats.

Signal receiving element 210 is operative to receive signals including audio, video and/or auxiliary data from signal sources, such as signal transmission source 10 in FIG. 1. Signal receiving element 210 may be embodied as any signal receiving element such as an antenna, input terminal or other element.

Signal splitter 220 is operative to split the signals provided from signal receiving element 210 into first and second frequency channels. According to an exemplary embodiment, television signal processing apparatus 200 may include a picture-in-picture (PIP) function wherein the first channel includes audio and/or video signals for a main picture, and the second channel includes audio and/or video signals for the PIP function.

Tuner 230 is operative to tune signals including audio, video and/or auxiliary data signals in the first channel when television signal processing apparatus 200 is in the on mode. Accordingly, tuner 230 may tune signals for the main picture of television signal processing apparatus 200. Demodulator 240 is operative to demodulate signals provided from tuner 230, and may demodulate signals in analog and/or digital transmission formats.

Tuner 250 is operative to tune signals including audio, video and/or auxiliary data signals in the second channel when television signal processing apparatus 200 is in the on mode. Accordingly, tuner 250 may tune signals for the PIP function of television signal processing apparatus 200. Additionally, tuner 250 is operative to tune signals including auxiliary data signals in the second channel when television signal processing apparatus 200 is in the standby mode. In this manner, tuner 250 enables television signal processing apparatus 200 to receive emergency alert signals in both the on mode and the standby mode. Demodulator 260 is operative to demodulate signals provided from tuner 250, and may demodulate signals in analog and/or digital transmission formats.

Switch 215 is operative to facilitate a connection or a disconnection between the power supply 225 and the first tuner 230 and the second tuner 250. The switch 215 is responsive to control signals from the processor 280. Such control signals may enable the switch to provide power or remove power from either tuner 230, 250 and any combination of tuners as prescribed by the processor 280 in response power state, such as on or standby, the preprogrammed duty cycle of the tuners 230, 250, the required tasks to be performed by the processor 280, such as receiving auxiliary data, or optionally, to the operating temperature of the signal processing circuitry or to enable other operations of the television signal processing apparatus 200, such as causing it to be switched from the off/standby mode to the on mode. Further details regarding these aspects of the present invention will be provided later herein.

Decoder 270 is operative to decode signals including audio, video and/or auxiliary data signals provided from demodulators 240 and 260. According to an exemplary embodiment, decoder 270 decodes digital data that represents emergency alert signals indicating an emergency event. Decoder 270 may also perform other decoding functions, such as decoding data which represents auxiliary data signals included in the vertical blanking interval (VBI) of an analog television signal. An example of an auxiliary data signal according to an exemplary embodiment, may include emergency alert signals include data comprising Specific Area Message Encoding (SAME) data associated with the emergency event. SAME data comprises a digital code representing information such as the specific geographical area affected by the emergency event, the type of emergency event (e.g., tornado watch, radiological hazard warning, civil emergency, etc.), and the expiration time of the event alert. SAME data is used by the National Weather Service (NWS) and other authorities to improve the specificity of emergency alerts and to decrease the frequency of false alerts. Other data and information may also be included in the emergency alert signals according to the present invention.

Processor and memory 280 are operative to perform various processing, control, and data storage functions of television signal processing apparatus 200. According to an exemplary embodiment, processor 280 is operative to process the audio and video signals provided from decoder 270, and may for example perform analog processing, such as National Television Standards Committee (NTSC) signal processing and/or digital processing, such as Motion Picture Expert Group (MPEG) processing.

The processor and memory 280 is also operative to receive the auxiliary data signals from decoder 270 and determine what actions are required based on the auxiliary data received. For example, if EPG data is received, the processor 280 may decide to sort the EPG data and store the data in the processor's associated memory 280. If the processor 280 receives auxiliary data associated with the emergency alert function of television signal processing apparatus 200, it may compare data in the emergency alert signals to user setup data stored in memory 280 to determine whether the emergency alert function is activated to activate emergency alert signals.

Audio amplifier 290 is operative to amplify the audio signals provided from processor 280. Speaker 235 is operative to aurally output the amplified audio signals provided from audio amplifier 290.

Video processor 245 is operative to process the video signals provided from processor 280. According to an exemplary embodiment, such video signals may include information based on the data contained in the received auxiliary data signals such as EPG information or emergency alert information. Video processor 245 may include closed caption circuitry that enables closed caption displays. Display 255 is operative to provide visual displays corresponding to processed signals provided from video processor 245.

Figure 3:
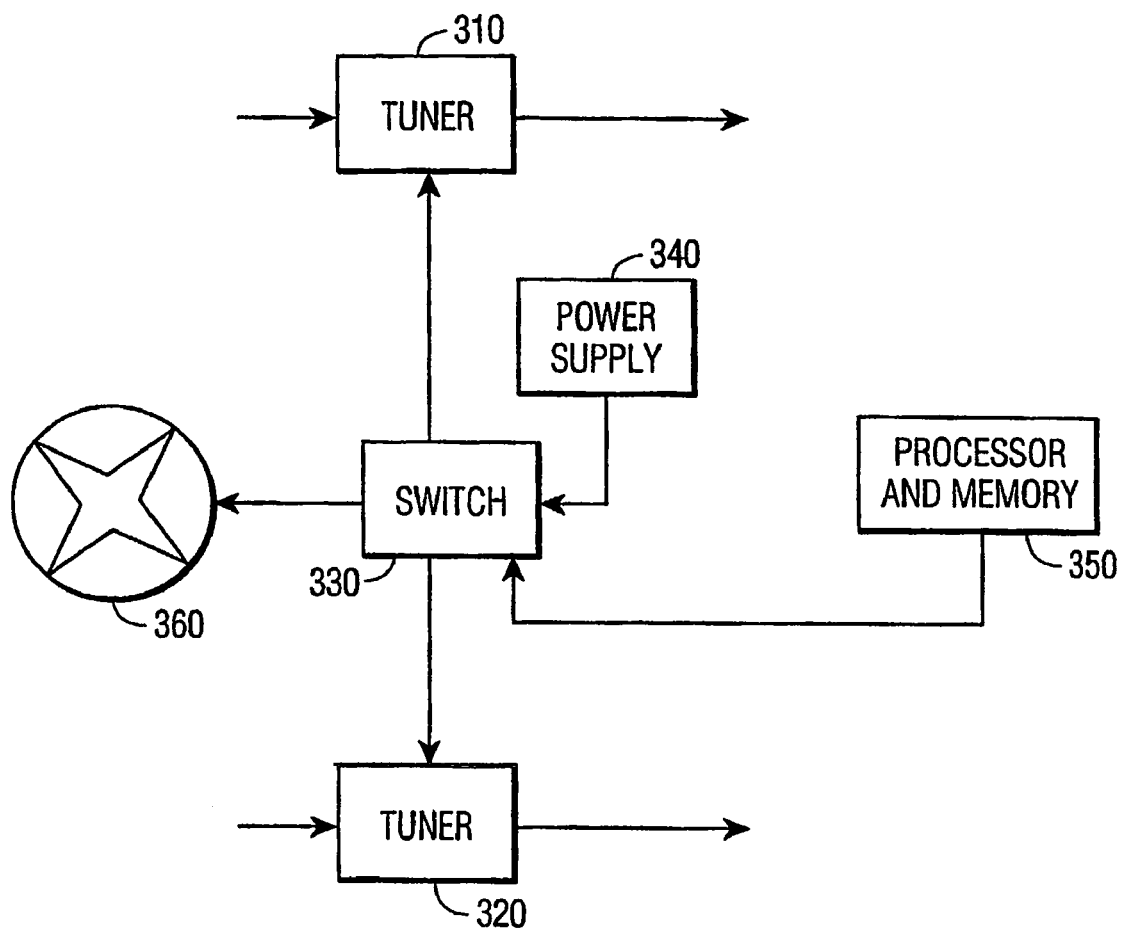
FIG. 3 a block diagram of first switching arrangement for tuner power supplies according to an exemplary embodiment of the present invention.

Referring to FIG. 3, a block diagram of an exemplary embodiment of switching arrangement for the power supply 340 to the tuners 310, 320 and an optional fan 360 is shown. In the exemplary embodiment depicted in FIG. 3, when the television signal processing apparatus 200 of FIG. 2 is ON, or in the normal operating mode, a fan may be used to reduce heat build up in the television signal processing apparatus 200 of FIG. 2. During standby mode, when the television signal processing apparatus 200 of FIG. 2 is still connected to a household power supply, but the television signal processing apparatus 200 of FIG. 2 is not in use and the video display 255 of FIG. 2 and the audio amplifier 290 of FIG. 2 are turned off, it is also desirable to remove power to the fan 360 to limit the noise created by the television signal processing apparatus 200 of FIG. 2 to avoid excess ambient noise. In order to disconnect the power supply 340 from either the first tuner 310 or the second tuner 320 or the fan 360, the processor 350 sends a control signal to the switch 330. The processor 350 can send the control signal to the switch 330 to alter the power provided to the tuners 310, 320 and the fan 360 based on a number of events or criteria. The control signal can be sent in response to a user command made via a remote control (not shown) to put the television signal processing apparatus 200 of FIG. 2 in a standby mode. The control signal can also be sent based on a preprogrammed duty cycle determined by the product designers which is optimized to keep the television signal processing apparatus operating below an optimal temperature, while still enabling the tuner to receiver auxiliary data when required.

Figure 4:
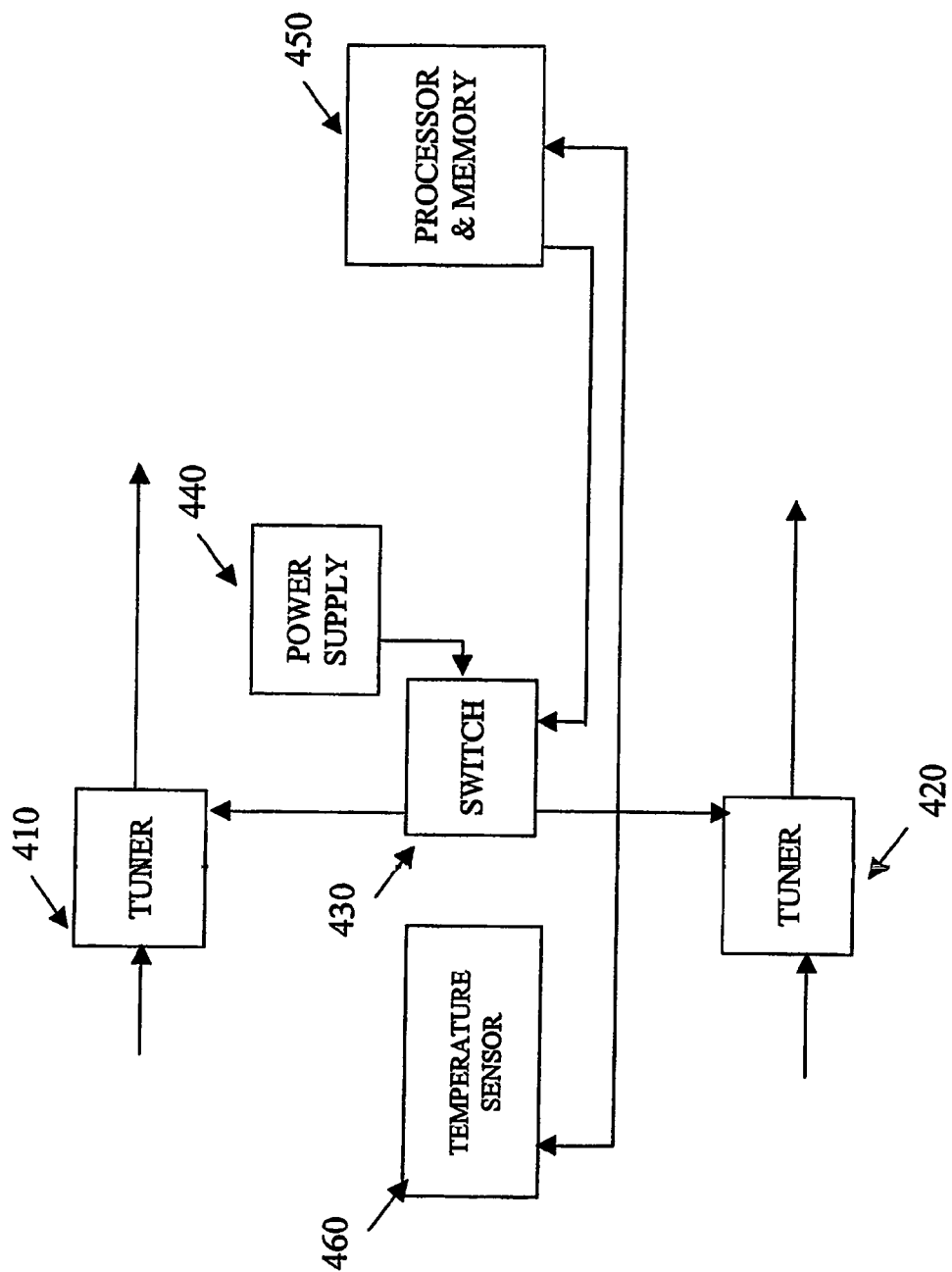
FIG. 4 a block diagram of second switching arrangement for tuner power supplies with an optional temperature sensor according to an exemplary embodiment of the present invention.

Referring to FIG. 4, a block diagram of an exemplary embodiment of switching arrangement for the power supply 440 to the tuners 410, 420 is shown, which further comprises a temperature sensor 460 which permits the processor 450 to alter the duty cycle of the tuners 410, 420 based on the temperature of television receiving apparatus 200 of FIG. 2. The temperature measured by the temperature sensor 460 may include the ambient temperature inside of the television signal processing apparatus 200 of FIG. 2, the temperature of a component or integrated circuit inside the television signal processing apparatus 200 of FIG. 2, either of the tuners 410, 420 or any combination of these temperatures. In this embodiment a fan, such as the fan 360 of FIG. 3, can also be used and controlled by the processor 450 to control the temperature of the television signal processing apparatus 200 of FIG. 2 in the various modes of operation.

Figure 5:
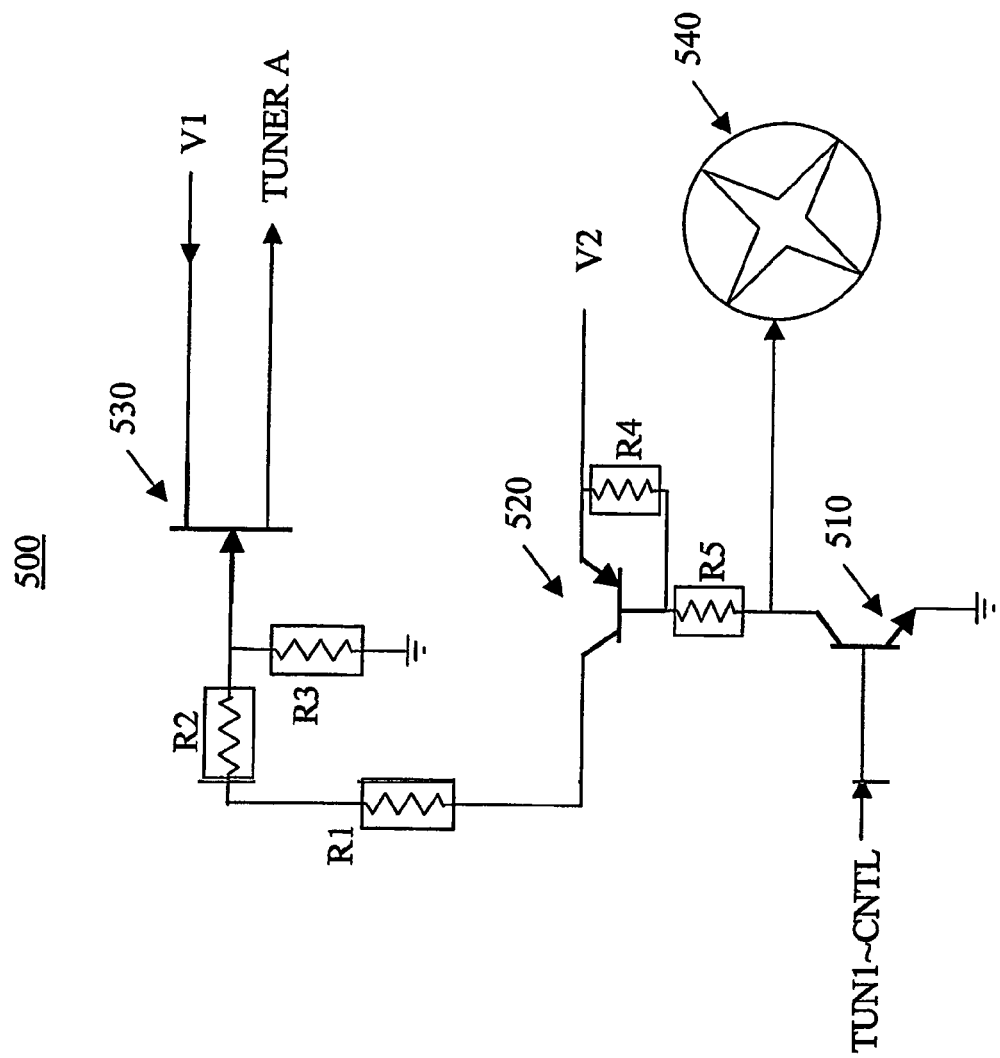
FIG. 5 a block diagram of a switching arrangement responsive to a control signal according to an exemplary embodiment of the present invention.

Referring to FIG. 5, a block diagram of an exemplary embodiment of the switching circuitry 500, such as the switch 215 of FIG. 2, is shown. In the exemplary embodiment depicted in FIG. 5, in order to turn off the power supply V1 to the tuner 230 of FIG. 2, a control signal (TUN1~CNTL) is provided. The state of this control signal is determined by the processor 280 of FIG. 2, which has sufficient information from various inputs, such as a power off signal received from a remote control (not shown) to know when the television signal processing apparatus 200 of FIG. 1 should be put into standby mode. To reduce unnecessary heat generation in the standby mode, two transistor switches 510, 520 are used operate a third transistor 530 to disconnect the first power supply (V1) from the tuner (Tuner A). The control signal goes high in the on mode and turns ON the first transistor switch 510, which in this exemplary embodiment is an NPN transistor. The first transistor switch 510 then causes the second transistor switch 520, which in this exemplary embodiment is a PNP transistor, to turn ON. When the second transistor switch 520 turns ON, it applies the correct gate bias voltage to the third transistor 530 to turn ON the third transistor 530. In this exemplary embodiment of the present invention, a FET transistor is used as the third transistor 530. Through a resistive divider network R1, R2, R3, the appropriate drive voltage to the third transistor 530 can be set-up. By the use of this divider network R1, R2, R3, the voltage applied to the gate of the third transistor switch 530 is correct for a second power supply V2 to be used and not overdrive the gate to source voltage. By the use of the low cost FET transistors for the third transistor 530, 96% of the tuner power dissipated is removed in the standby mode. FET transistors are used over bipolar switches in order to minimize the amount of power required to turn the tuner ON or OFF. In order to power a fan 540 during the on mode, the fan 540 can be connected to the switching circuitry 500 at an appropriate point to provide the correct input power and proper operating state for each of the operating modes. In the exemplary embodiment, a second resistor network R4, R5 is used to provide the appropriate bias voltage level to transistor 520. In on mode, the first transistor 510 is turned on, and the input voltage to the fan is dropped to zero and thus turns the fan 540 on. In the exemplary embodiment depicted in FIG. 5, switching circuitry to control the power to a single device is shown. In order to control multiple devices independently, multiple implementations of the switching circuitry shown in FIG. 5 can be used or an appropriate combination of parts of the switching circuitry can be used to achieved the desired operational results.

As described herein, the present invention provides techniques for receiving emergency alert signals using an apparatus such as a television signal processing apparatus and/or modem. The present invention may be applicable to various apparatuses, either with or without a display device. Accordingly, the phrase "television signal processing apparatus" as used herein may refer to systems or apparatuses capable of receiving and processing television signals including, but not limited to, television sets, or monitors that include a display device, and systems or apparatuses such as set-top boxes, video cassette recorders (VCRs), digital versatile disk (DVD) players, video game boxes, personal video recorders (PVRs), or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A television signal processing apparatus comprising:
   a first tuner for tuning a first signal when said television signal processing apparatus is in a first mode of operation and where power is removed from said first tuning means during a second mode of operation;
   a second tuner for tuning a second signal when said television signal processing apparatus is in a first mode of operation and a second mode of operation, wherein power is applied for a portion of the time said television signal processing apparatus is in said second mode of operation; and
   a controller for applying power to said first tuner and said second tuner during said first mode of operation and for removing power from said first tuner during said second mode of operation, said controller further operative to cyclically apply and remove power to said second tuner during said second mode of operation, wherein power is applied to said second tuner less than 100 percent of the time said television signal processing apparatus is in said second mode of operation; and
   wherein said power is applied during said second mode of operation in response to a temperature measurement.

2. The television signal processing apparatus of claim 1 wherein power is applied to said second tuner during said portion of the time said television signal processing apparatus is in said second mode of operation to facilitate the reception of auxiliary data.

3. The television signal processing apparatus of claim 2 wherein said auxiliary data is program guide information.

4. The television signal processing apparatus of claim 2 wherein said auxiliary data is an emergency alert signal.

5. A method for controlling power dissipation in a signal processing apparatus comprising the steps of:
   applying power to a first tuner and a second tuner in a first mode of operation;
   removing power from said first tuner in a second mode of operation; and
   applying power to cyclically apply and remove power to said second tuner during said second mode of operation, wherein power is applied to said second tuner less than 100 percent of the time duration of said second mode of operation; and
   wherein said power is applied during said second mode of operation in response to a temperature measurement.

6. The method of claim 5 wherein power is applied to said second tuner during said period of said second mode of operation to facilitate the reception of auxiliary data.

7. The method of claim 6 wherein said auxiliary data is program guide information.

8. The method of claim 6 wherein said auxiliary data is emergency alert signals.

* * * * *